April 8, 1924.
L. VIEZZI
RAIL JOINT
Filed Aug. 29, 1923
1,490,047
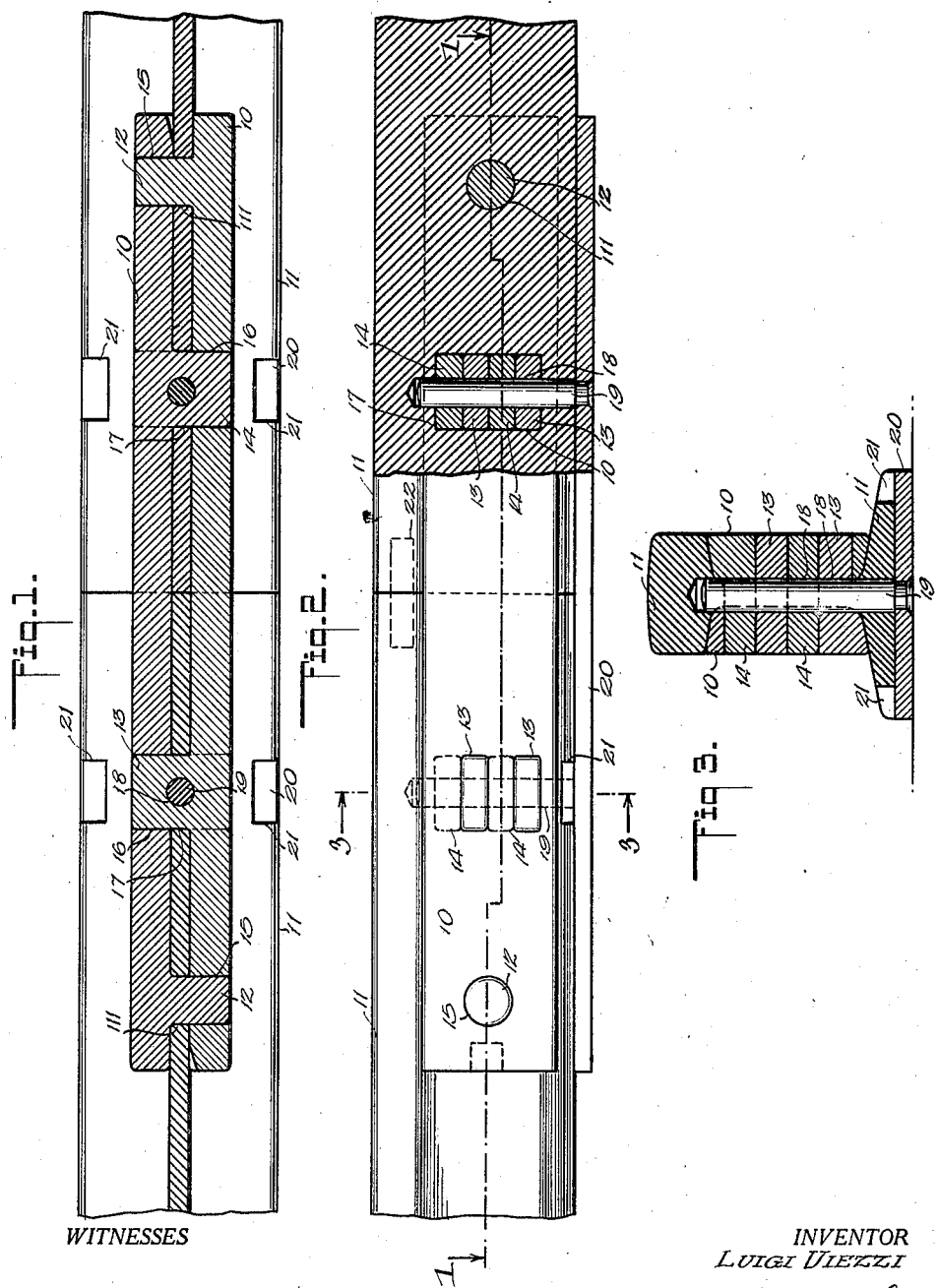
WITNESSES
INVENTOR
LUIGI VIEZZI
BY
ATTORNEYS Patented Apr. 8, 1924.

1,490,047

UNITED STATES PATENT OFFICE.

LUIGI VIEZZI, OF WEST NEW YORK, NEW JERSEY, ASSIGNOR OF ONE-HALF TO JOSEPH STILZ, OF WEST NEW YORK, NEW JERSEY.

RAIL JOINT.

Application filed August 29, 1923. Serial No. 660,043.

*To all whom it may concern:*

Be it known that I, LUIGI VIEZZI, a citizen of the United States of America, and a resident of West New York, county of Hudson, and State of New Jersey, have invented a new and Improved Rail Joint, of which the following is a description.

My invention relates to a rail joint and particularly to a joint in which fish plates are employed to overlap the adjacent rail ends.

The general object of my invention is to provide an improved joint the elements of which may be emplaced or removed with facility and which will be effective in maintaining the rails in alinement.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a horizontal section on the line 1—1, Figure 2, showing portions of adjacent rails connected by my improved assemblage of joined parts;

Figure 2 is a partly sectional plan view;

Figure 3 is a transverse vertical section as indicated by the line 3—3, Figure 2.

In carrying out my invention in accordance with the illustrated example fish plates 10 are provided for opposite sides of the joint of the rails 11 disposed as usual between the rail heads and the base flanges of the rails.

Adjacent one end of each fish plate 10 at the inner side is a lateral pin 12, the pins on the respective fish plates being provided at opposite ends of said plates. On each fish plate also between the transverse medial line and the end pin 12 are provided pairs of lateral lugs, the lugs of one plate being designated 13 and those on the opposite plate designated 14.

The pins 12 pass through holes 111 in the webs of the rails 11 and the pin 12 on one fish plate 10 after passing through a hole 111 in a rail, is received in an alined pin hole 15 in the opposite fish plate 10. Similarly the pair of lateral lugs 13 on each fish plate 10 are received in slots 16 in the opposite plate. Thus, there are two pairs of lugs 13 on each fish plate. The lateral lugs on one plate 10 are in staggered relation to the lugs on the opposite fish plate 10.

In the webs of the rails 11 are formed transverse rectangular holes 17 of a size to accommodate two pairs of lugs 13, 14, that is to say, one pair of lugs 13 on one fish plate and a pair of lugs 14 on the other fish plate.

The lugs 13, 14 are formed with aligned vertical pin holes 18 and thus are adapted to receive vertical pins 19 on a base plate 20, said plate overlapping the adjacent rail ends and lying beneath the bases of the rails.

With the described rail joint elements, the fish plates are first placed in position against the rails with the respective pins 12 passing through the holes 111 in the rails and into the respective holes 15 of the respective plates. The provision of the pins 12 and holes 15 serves to properly position the lugs 13 so that the vertical holes 18 therein will aline. The rail ends with the fish plates placed thereon are dropped onto the base plate 20 so that the pins 19 pass into the alined holes 18. With a view to the disassembling of the joint elements with facility, I form notches 21 in the bases of the rails 11 at the side edges so that a suitable tool may be positioned to rest on the base plate 20, whereupon a blow struck from above on said tool thus resting on the base plate will serve to knock the base plate from its position, thereby withdrawing the pins 19 from the alined holes 18 which will permit the fish plates to be removed.

In Figure 2 the numeral 22 indicates a tenon extending into both rail ends for conductive purposes.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a rail joint, fish plates, a lateral pin on each fish plate, the one pin being at the opposite end from the pin on the other plate, each plate having transverse holes between the transverse medial line of the plate and an end thereof, pairs of lateral lugs on each plate adapted to be passed respectively through the adjacent rails, the transverse holes of one plate accommodating the lugs of the opposite plate, the several lugs having pin holes vertically alining when the fish plates are positioned, a base plate adapted to be disposed beneath the rails to cross the joint, and vertical pins on said base plate in position to pass through the vertical holes in said lugs.

2. In a rail joint, fish plates, each fish plate having lateral lugs adapted to pass through the rail and into the opposite fish plate, the lugs on one plate being disposed in vertical alinement with the lugs on the other plate, the several lugs having alining vertical pin holes, and vertical pins adapted to be accommodated in the holes of the lugs.

3. In a rail joint, fish plates, each fish plate having lateral lugs adapted to pass through the rail and into the opposite fish plate, the lugs on one plate being disposed in vertical alinement with the lugs on the other plate, the several lugs having alining vertical pin holes, and vertical pins adapted to be accommodated in the holes of the lugs; together with a lateral pin on each of the fish plates near the end thereof, the pins on the respective plates being at opposite ends of said plates, one plate having a hole to accommodate the lateral pin of the other plate.

4. The combination with alining track rails having notches in the base flanges, of a rail joint including fish plates, lateral members on the fish plates, the webs of the rails having transverse holes for said members, and each plate having a lateral hole to receive the lateral member on the other fish plate, a base plate beneath the rail ends extending beneath said notches in the base flanges of the rails, and vertical pins on said base plate, said lateral members and the rails having alined vertical holes to receive said pins.

LUIGI VIEZZI.

Witness:
JOSEPH STILZ.